United States Patent
Chakkalakkal et al.

(10) Patent No.: US 10,931,110 B2
(45) Date of Patent: Feb. 23, 2021

(54) DEVICES AND METHODS FOR CAPACITOR BANK POWER SWITCHING CIRCUITS

(71) Applicant: Eaton Intelligent Power Limited, Dublin (IE)

(72) Inventors: Sreejith Chakkalakkal, Pune (IN); Amogh Vilas Kank, Dombivli (IN); Mark Allan Juds, New Berlin, WI (US)

(73) Assignee: Eaton Intelligent Power Limited, Dublin (IE)

( * ) Notice: Subject to any disclaimer, the term of this patent is extended or adjusted under 35 U.S.C. 154(b) by 236 days.

(21) Appl. No.: 16/245,534

(22) Filed: Jan. 11, 2019

(65) Prior Publication Data
US 2020/0227916 A1   Jul. 16, 2020

(51) Int. Cl.
| H02J 3/14 | (2006.01) |
| H02M 5/08 | (2006.01) |
| G05F 1/70 | (2006.01) |
| H02J 3/18 | (2006.01) |

(52) U.S. Cl.
CPC ............... *H02J 3/14* (2013.01); *G05F 1/70* (2013.01); *H02J 3/18* (2013.01); *H02M 5/08* (2013.01)

(58) Field of Classification Search
CPC ..... H02J 3/14; H02J 3/18; G05F 1/70; H02M 5/08
See application file for complete search history.

(56) References Cited

U.S. PATENT DOCUMENTS

| 3,607,689 | A | * | 9/1971 | Inoue | B23H 3/02 205/649 |
| 3,671,775 | A | * | 6/1972 | Kam | H03B 19/16 327/116 |
| 4,286,317 | A | * | 8/1981 | Kommissari | H02M 7/5152 363/136 |
| 5,210,674 | A | * | 5/1993 | Yamaguchi | H02H 7/001 361/19 |
| 5,367,197 | A | * | 11/1994 | Klerfors | H02J 3/24 307/105 |
| 5,384,528 | A | * | 1/1995 | Leowald | H02J 3/1807 323/209 |
| 6,373,216 | B1 | * | 4/2002 | Ho | H02P 7/05 318/563 |
| 9,467,112 | B2 | * | 10/2016 | English | H02J 3/1807 |

OTHER PUBLICATIONS

"Medium Voltage Switching Devices: Technologies and Applications" Distribution Solutions, Technical Application Papers No. 26, ABB, 2018. (124 pages).

* cited by examiner

*Primary Examiner* — Adolf D Berhane
(74) *Attorney, Agent, or Firm* — Myers Bigel, P.A.

(57) ABSTRACT

An electronic device is configured to be coupled to a capacitor bank in a power system network. The electronic device includes a first switch, a second switch, and a damping circuit in series with the second switch. The damping circuit includes a passive damping circuit and a thyristor that is in parallel with the passive damping circuit. Related methods and circuits are also described.

18 Claims, 12 Drawing Sheets

Closing S1 (Turn-On):

| | | | S1 | S2 | T |
|---|---|---|---|---|---|
| Initial Condition | = All switches Open | | 0 | 0 | 0 |
| · Close S2 | - while polarity is B | → | 0 | 1 | 0 |
| · CloseT | - while polarity is A | → | 0 | 1 | 1 |
| · Close S1 | - while polarity is B | → | 1 | 1 | 1 |
| · Open S2 & T | - at any time | | 1 | 0 | 0 |

Final Condition- Only S1 Closed

Opening S1 (Turn-Off):

| | | | S1 | S2 | T |
|---|---|---|---|---|---|
| Initial Condition | = Only S1 Closed | | 1 | 0 | 0 |
| · Close S2 | - at any time | | 1 | 1 | 0 |
| · CloseT | - while polarity is A | → | 1 | 1 | 1 |
| · Open S1 | - while polarity is B | → | 0 | 1 | 1 |
| · Open T | - while polarity is A | → | 0 | 1 | 0 |
| · Open S2 | - while polarity is B | → | 0 | 0 | 0 |

Final Condition- All switches Open

DEVICES AND METHODS FOR CAPACITOR BANK POWER SWITCHING CIRCUITS

FIELD

Various embodiments described herein relate to methods and devices for power switching circuits and more particularly to power switching circuits for capacitor banks.

BACKGROUND

Proliferation of Renewable Energy Resources (RES) and the associated challenges in power utility control are common in present day power systems. Higher renewable energy resource penetration may demand more frequent actions on the control elements distributed across the power system networks, which may reduce the life of components like capacitor banks, Load Tap Changers (LTCs), Line Voltage Regulators (LVRs), etc. Heavy inrush currents associated with the switching of capacitor banks are one of the key concern in a power system and also one of the primary cause of reduced life of capacitor banks and other equipment. Such heavy inrush currents together with the subsequent harmonics may impose stresses on the capacitor bank and/or impact the performance of neighboring loads and devices.

SUMMARY

Various embodiments of the present invention are directed to an electronic device that is configured to be coupled to a capacitor bank in a power system network. The electronic device includes a first switch, and a damping circuit in series with a second switch. The damping circuit includes a passive damping circuit and a thyristor that is in parallel with the passive damping circuit.

According to some embodiments, the passive damping circuit includes a resistive element and a diode that may be in series with the resistive element. The first switch and second switch may be coupled to each other and are configured to be coupled to the capacitor bank. The first switch may be coupled to a grid power source. The damping circuit may be coupled to the grid power source. The passive damping circuit may be configured to dampen current harmonics and voltage harmonics during switching of the capacitor bank to a grid power source. The passive damping circuit may be configured to remove current harmonics and voltage harmonics during switching of the capacitor bank to a grid power source. The electronic device may be configured to eliminate transient current when a grid power source is coupled through the electronic device to the capacitor bank.

According to some embodiments, the electronic device may be configured to receive an alternating current (AC) power signal from the grid power source. The second switch may be configured to be activated when the AC power signal from the grid power source has negative polarity. The diode may be configured to be turned on responsive to the AC power signal transitioning to positive polarity such that the AC power signal flows through the diode and the second switch. The thyristor may be configured to be turned on based on an activation pulse from a control circuit, and/or the thyristor may be configured to be turned on after the diode has been turned on.

According to some embodiments the diode may be configured to be turned off responsive to the AC power signal transitioning to negative polarity such that the AC power signal flows through the second switch and the thyristor. After the diode has been turned on responsive to the AC power signal transitioning to positive polarity and turned off responsive to the AC power signal transitioning to negative polarity, the first switch may be configured to be activated such that the AC power signal flows through the first switch to the capacitor bank. The second switch may be configured to be deactivated after the first switch has been activated such that the AC power signal flows through the first switch to the capacitor bank.

Various embodiments of the present invention are directed to a circuit configured to be coupled to a capacitor bank in a power system network and configured to be coupled to an alternating current (AC) power signal from a grid power source. The circuit includes a controller configured to control a first current path and a second current path that are between the grid power source and the capacitor bank. The circuit is configured to conduct current in a first direction along the first current path, responsive to a second switch in the first current path being activated, and the circuit is configured to conduct the current in a second direction along the second current path, responsive to the AC power signal transitioning to a negative polarity.

According to some embodiments, the controller may be further configured to control a third current path between the grid power source and the capacitor bank. The circuit may be configured to conduct the current along the third current path, responsive to a first switch in the third current path being activated. The third current path is different from the first current path and the second current path. The circuit may further include a damping circuit in series with the second switch. The damping circuit may include a thyristor in the second current path. The circuit may include a passive damping circuit in parallel with the thyristor, such that the passive damping circuit includes a diode that is in the first current path. The second switch may be configured to be activated by the controller when the AC power signal from the grid power source has negative polarity. The diode may be configured to be turned on responsive to the AC power signal transitioning to positive polarity. The AC power signal flows through the first current path including the diode and the second switch when the second switch has been activated. The thyristor may be configured to be turned on when the AC power signal from the grid power source has positive polarity. The diode may be configured to be turned off, responsive to the AC power signal transitioning to negative polarity such that the AC power signal flows through the second current path. The first switch may be configured to be activated when the AC power signal from the grid power source has negative polarity such that the AC power signal flows through the first switch to the capacitor bank. The second switch may be deactivated by the controller after the current is flowing through the first switch.

According to some embodiments, the passive damping circuit further includes a resistive element connected in series with the diode and connected to an anode of the diode. The thyristor may be turned on based on an activation pulse from the control circuit. The second switch may be deactivated when no current is flowing through the second switch.

Various embodiments of the present invention are directed to a method of operating an electronic device that is configured to be coupled to a capacitor bank in a power system network and configured to be coupled to an alternating current (AC) power signal from a grid power source. The method includes activating a second switch when the AC power signal from the grid power source has negative polarity. The second switch is in series with a damping circuit including a thyristor in parallel with a passive damping circuit that includes a diode. The method includes turning on the diode, responsive to the AC power signal transitioning to positive polarity. The AC power signal flows through the diode and the second switch that has been activated. The method includes turning on the thyristor and turning off the diode, responsive to the AC power signal transitioning to negative polarity such that the AC power signal flows through the second switch and the thyristor. The method includes activating a first switch such that the AC power signal flows through the first switch to the capacitor bank, and deactivating the second switch.

Further features, advantages and details of the present invention will be appreciated by those of ordinary skill in the art from a reading of the figures and the detailed description of the preferred embodiments that follow, such description being merely illustrative of the present invention.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

BRIEF DESCRIPTION OF THE DRAWINGS

FIG. 17 is a table of indicating various scenarios of operation of the circuits of FIGS. 1, 2, 3B, 4B, 5B, 6B, 7B, 8, 9B, 10B, 11, 12B, and 13B, 14, 15, and/or 16, according to various embodiments described herein.

DETAILED DESCRIPTION

Figure 1:
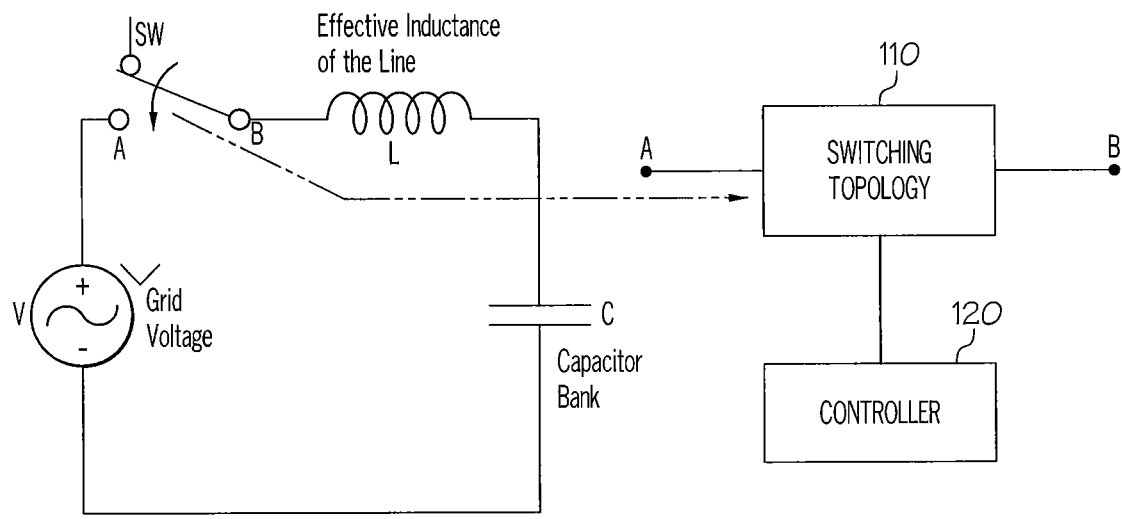
FIG. 1 is an electronic circuit for connecting a grid voltage to a capacitor bank, according to various embodiments described herein.

Various embodiments will be described more fully hereinafter with reference to the accompanying drawings. Other embodiments may take many different forms and should not be construed as limited to the embodiments set forth herein. Like numbers refer to like elements throughout.

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

High voltage switches are used in various systems to connect an Alternating Current (AC) grid power source to a capacitor bank. An electrical switch connecting the AC grid power source to an electrical load such as a capacitor bank may cause heavy inrush currents and associated voltage harmonics. Additionally, repeated use of the switch may result in failure of the switch to have an open terminal or shorting of the terminals. The operating life of capacitor banks thus may be drastically reduced. Such a failure during the lifetime of the switch may result in damage to the capacitor bank or in inefficient supplying of power from the AC power source.

Current surges during switching of the AC grid power source to power the capacitor bank are of concern. Switching of a capacitor bank in a power system network may cause heavy inrush currents and subsequent harmonics, which could impose stresses on the capacitor bank and/or impact the performance of neighboring loads and devices. These current stresses may also reduce the switching efficiency and/or result in failure of the switch and/or capacitor bank. Capacitor bank switching topologies are used to reduce or eliminate the current surges during their switching in the power system network.

Various embodiments described herein may arise from recognition that switching topologies that reduce or remove the heavy inrush current and/or harmonics of the current from the AC power supply may be used to improve performance of the power system network. Multiple switching elements with controlled switching orders may be used to reduce or remove the heavy inrush current and/or current harmonics during capacitor bank initialization.

Inrush current associated with the switching of a capacitor bank in a distribution feeder may be limited in legacy systems by inserting a compensating reactor in series with the capacitor during the switching intervals. The reactor may behave as an impedance to oppose sudden changes in current. However, connecting a reactor may make the system bulkier and may not dampen the harmonic contents of the AC current. The reactor may need higher investment cost and more space to install.

According to various embodiments of the inventive concepts, a hybrid switching solution may combine suitable switching characteristics of solid state technology together with the favorable conduction and blocking properties of a mechanical contact. Thus, a hybrid switching solution may allow a higher voltage withstanding capacity and lower conduction losses. A damping resistive element, such as a resistor, may be used to effectively dampen the switching harmonics, thus allowing the capacitor bank switching to occur in a smoother fashion by reducing the current stress and voltage transients at the point of connection. Any value of damping resistance may be used to eliminate the switching transients and to make the switching smoother. In some embodiments, zero voltage and zero current switching may be obtained by effectively synchronizing the operation of the mechanical contact with respect to the feeder voltage, which allows the commutation of solid state devices at suitable time instants.

As described herein, various embodiments may be beneficial for increasing the life of power system capacitor banks used in medium voltage distribution networks. Applications of the inventive concepts may be extended to other medium or low voltage switching applications including resonant or reactive dominant loads. The inventive concepts also may be applied to three phase power systems, where the switches described herein may be used in various phases of a three phase network.

FIG. 1 illustrates a switch for connecting a grid power source to a capacitor bank, according to various embodiments described herein. Referring now to FIG. 1, grid power source V is connected to capacitor bank C using a switch SW. The line connecting to the capacitor bank C may have an effective inductance L of the line. The switch SW is connected between ports A and B such that switch SW interfaces to the grid power source V and the capacitor bank C. The switch SW may be configured to receive an alternating current (AC) power signal from the grid power source V. Switch SW may include a switching topology 110, as described herein. Switching topology 110 may include various circuit configurations such as the switching circuits of FIGS. 2, 8, and/or 11.

In some embodiments, the power system network may include a controller 120. The controller 120 may include a processor circuit and a memory circuit containing computer readable program code. The processor circuit may include one or more data processing circuits, such as a general purpose and/or special purpose processor, e.g., microprocessor and/or digital signal processor, that may be collocated with the switch SW or distributed across one or more networks with communication to the switch SW and/or other elements of the power system network. The processor circuit may be configured to execute the computer readable program code in the memory to perform at least some of the operations and methods of described herein to control elements included in the switching topology 110. The controller 120 may be connected with an AC power unit such as the grid power source V, directly or indirectly. Operations described herein may be synchronized based on clocking associated with a processor circuit of the controller 120 and/or synchronized to the grid power source V.

Figure 2:
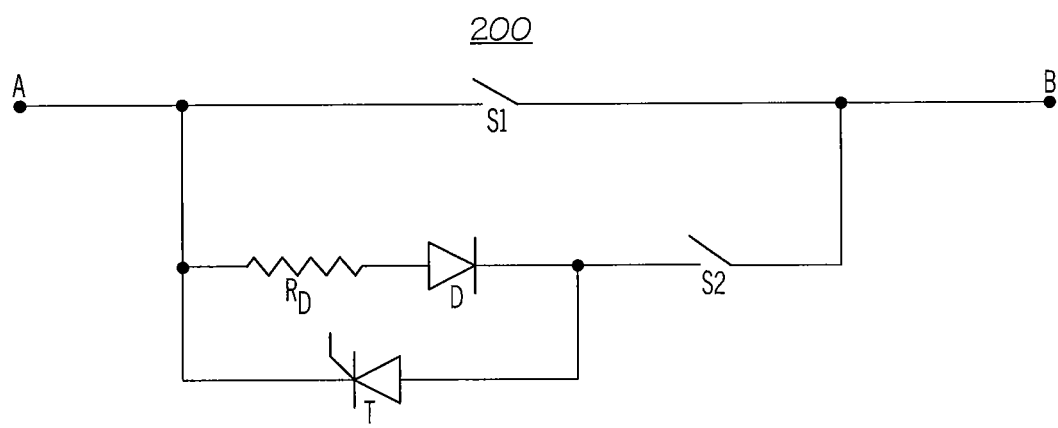
FIGS. 2, 3B, 4B, 5B, 6B, 7B, 8, 9B, 10B, 11, 12B, and 13B are electronic circuits to switch capacitor banks, according to various embodiments described herein.

FIG. 2 is an electronic circuit that can be coupled to the capacitor bank C and the grid power source V of FIG. 1. Referring now to FIG. 2, the electronic circuit 200 includes a first switch S1 and a second switch S2. Thyristor T, diode D, and resistive element RD form a damping circuit that is in series with the second switch S2. Diode D and resistive element RD are in series with one another and are collectively in parallel with thyristor T. Diode D and resistive element RD form a passive damping circuit. The first switch S1 and second switch S2 are coupled to each other and are configured to be coupled to the capacitor bank C of FIG. 1 at port B. The first switch and the damping circuit are coupled to the grid power source V of FIG. 1 at port A. The passive damping circuit, which includes diode D and resistive element RD, may be configured to dampen current harmonics and voltage harmonics during switching of the capacitor bank C to a grid power source V of FIG. 1. In some embodiments, the passive damping circuit may be configured to remove current harmonics and voltage harmonics during switching of the capacitor bank C to a grid power source V. The electronic circuit 200 of FIG. 2 may be configured to eliminate transient current when a grid power source V is coupled through the electronic circuit 200 to the capacitor bank C.

The controller 120 of FIG. 1 may control elements such as first switch S1, second switch S2, and thyristor T of the electronic circuit 200. The controller 120 may be configured to execute the computer readable program code in the memory to perform at least some of the operations and methods of described herein to control elements such as first switch S1, second switch S2, and thyristor T of the electronic circuit 200.

Figure 3A:
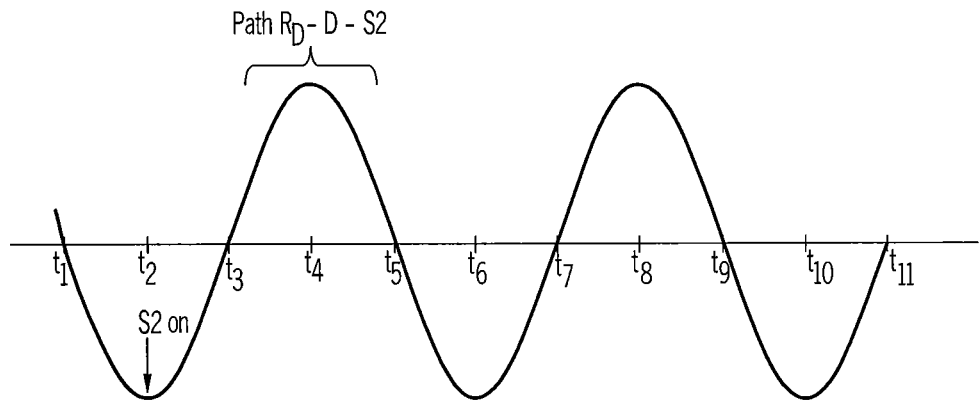
FIGS. 3A, 4A, 5A, 6A, 7A, 9A, 10A, 12A, and 13A are waveforms associated with the electronic circuits of FIGS. 2, 3B, 4B, 5B, 6B, 7B, 8, 9B, 10B, 11, 12B, and 13B, according to various embodiments described herein.
Figure 4A:
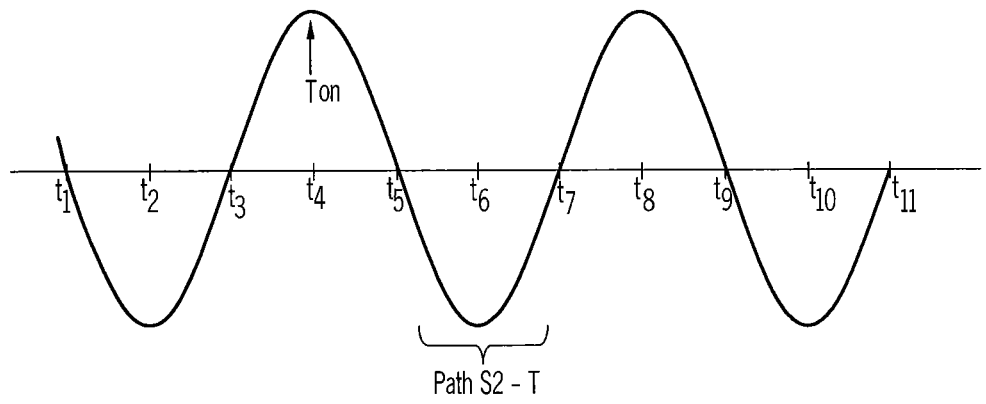
Figure 5A:
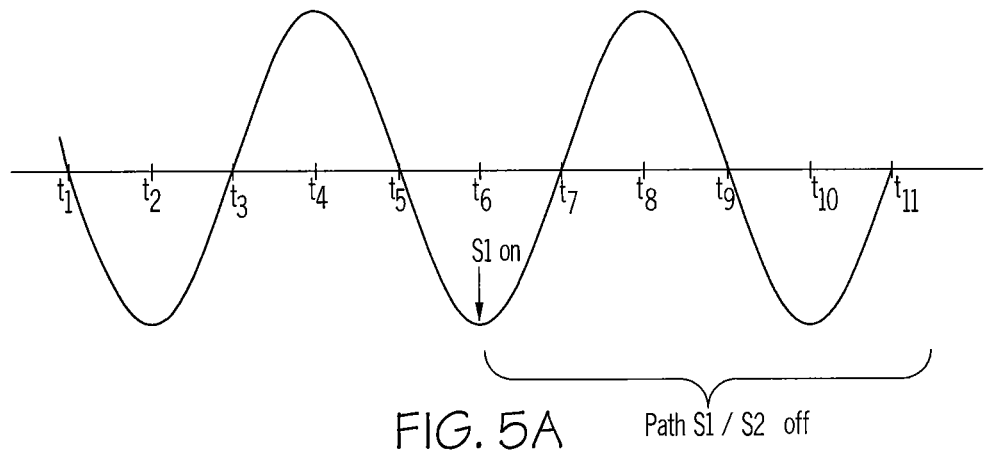
Figure 3B:
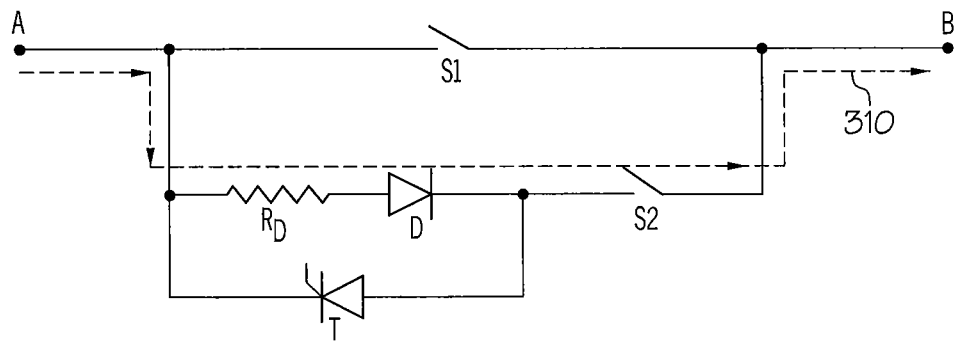
Figure 4B:
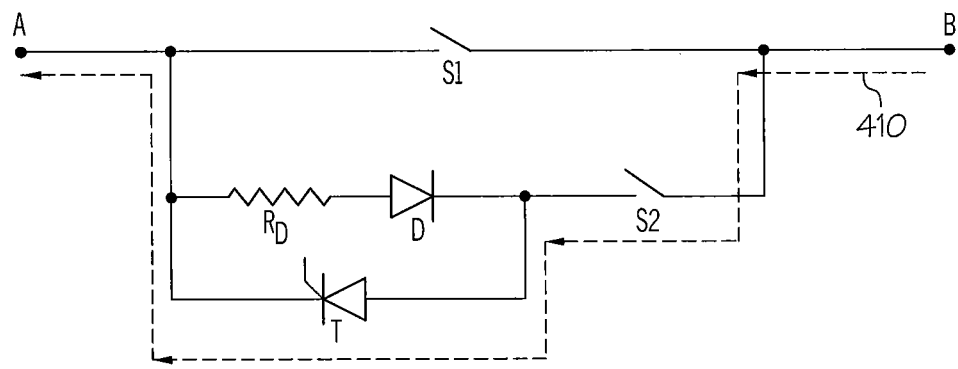
Figure 5B:
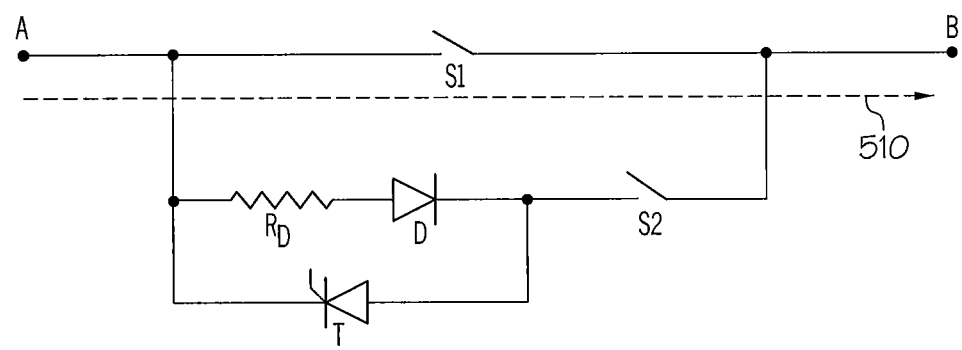

The controller 120 of FIG. 1 may turn on or activate various elements of the electronic circuit 200 of FIG. 2. As used herein, "turning on" or "activating" an element may refer to the element being operated in an active state or in a conductive state that allows current to flow. In the case of a switch, a "turned on" switch would be in the closed state such that current may be conducted. As used herein, "turning off" or "deactivating" an element may refer to the element being operated in an inactive state or in a non-conductive state that does not allow current to flow. In the case of a switch, a "turned off" switch would be in the open state such that current may not be conducted. Operations in relation to waveforms related to turning on the electronic circuit 200 to power the capacitor bank C of FIG. 1 are illustrated in the AC current graphs of FIGS. 3A, 4A, and 5A. Related current flows in the electronic circuit 200 of FIG. 2 are shown in FIGS. 3B, 4B, and 5B. Referring to FIG. 3A, switch S2 may be activated, i.e. turned on or closed, at time t2. Switch S2 is configured to be activated when the AC power signal from the grid power source has negative polarity. When the AC power signal transitions to positive polarity at time t3, diode D will be conducting such that current flows through the circuit along path 310, as shown in FIG. 3B. In other words, diode D is configured to be turned on responsive to the AC power signal transitioning to positive polarity such that the AC power signal flows through the diode D and the switch S2. FIG. 4A illustrates that thyristor T is turned on at time t4. The thyristor T is configured to be turned on based on an activation pulse from the controller 120 of FIG. 1. The thyristor may be turned on as soon as the diode starts conducting but before the polarity of AC power signal reverses to negative. The thyristor being turned on may be accomplished through an activation pulse from a control circuit associated with the controller 120. The thyristor T is configured to be turned on after the diode D has been turned on, i.e. conducting. Diode D turns off, i.e. does not conduct, at time t5, responsive to the AC power signal transitioning to negative polarity such that the AC power signal flows through switch S2 and the thyristor T, as shown in FIG. 4B by path 410. FIG. 5A illustrates that switch S1 is activated, i.e. turned on, at time t6. Switch S1 is activated after the diode D has been turned on responsive to the AC power signal transitioning to positive polarity and turned off responsive to the AC power signal transitioning to negative polarity. In some embodiments, switch S1 may be activated after the thyristor T is turned ON and the current has started flowing through path 410. The AC power signal flows through the switch S1 to the capacitor bank in path 510 of FIG. 5B. Switch S2 may be turned off after switch S1 begins conducting.

Figure 6A:
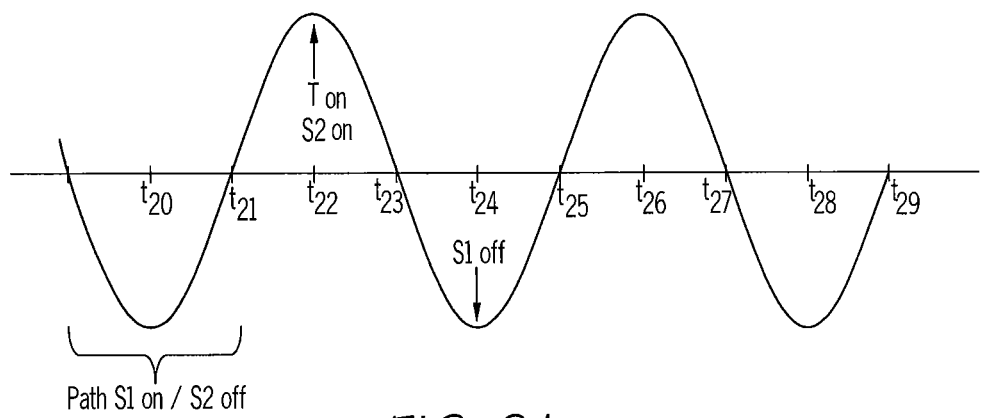
Figure 7A:
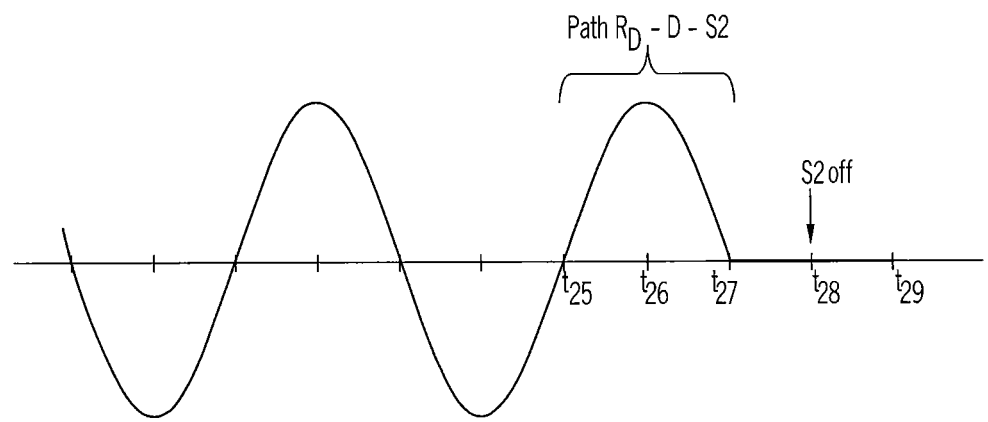
Figure 6B:
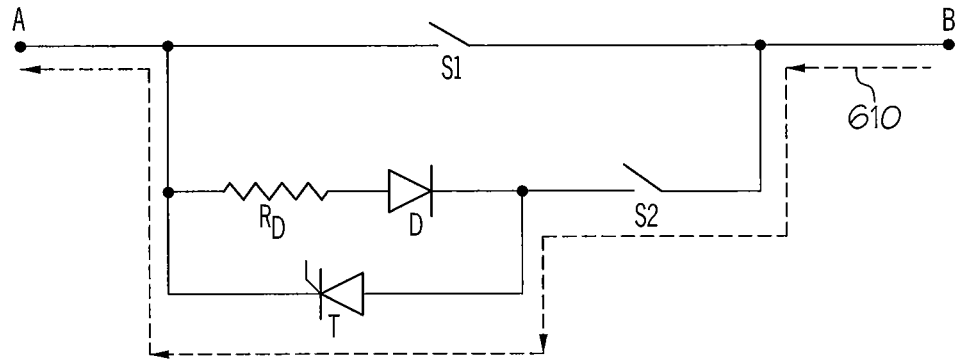
Figure 7B:
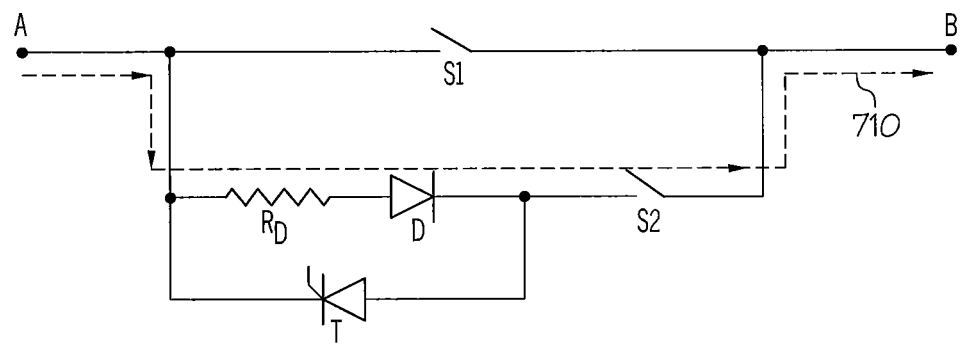

Operations related to turning off the electronic circuit 200 of FIG. 2 to remove power from the capacitor bank C of FIG. 1 are illustrated in the AC current graphs of FIGS. 6A and 7A. Related current flows in the electronic circuit 200 of FIG. 2 are shown in FIGS. 6B and 7B. Referring to FIG. 6A, the capacitor bank is being powered by the grid power source V such that current is flowing through switch S1. At time t22, thyristor T and switch S2 may be turned on, i.e. activated or closed. At time t23, when the AC power signal transitions to negative polarity, thyristor T will be conducting such that the current flows in path 610 of FIG. 6B through switch S2 and thyristor T. At time t24, while the thyristor is conducting, switch S1 may be turned off. At time t25, when the AC power signal transitions to positive polarity, diode D will begin conducting current such that current flows in path 710 of FIG. 7B, through resistive element RD, diode D, and switch S2. At time t27, when the AC power signal transitions to negative polarity, diode D is not conducting current, thus removing power from the capacitor bank C. S2 may be deactivated, i.e. turned off, during the AC power signal's negative polarity cycle, for example, at time t28 as shown in FIG. 7A. Although specific example polarities are described herein, interchanging the polarity is possible, but switching sequences may be adopted to the new configuration accordingly.

Figure 8:
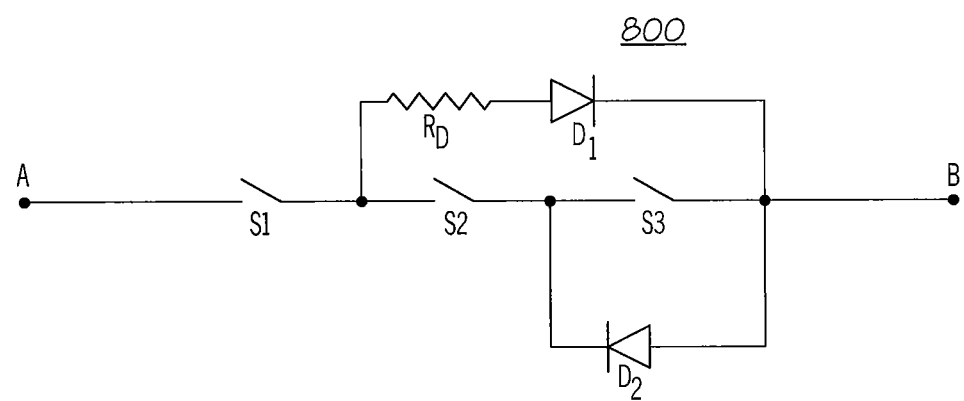
Figure 9A:
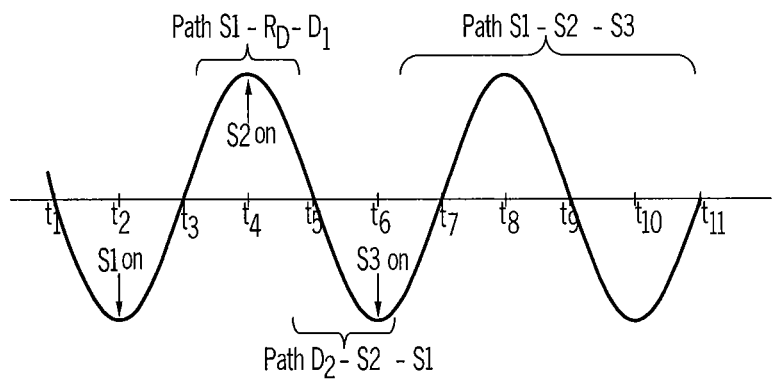
Figure 9B:
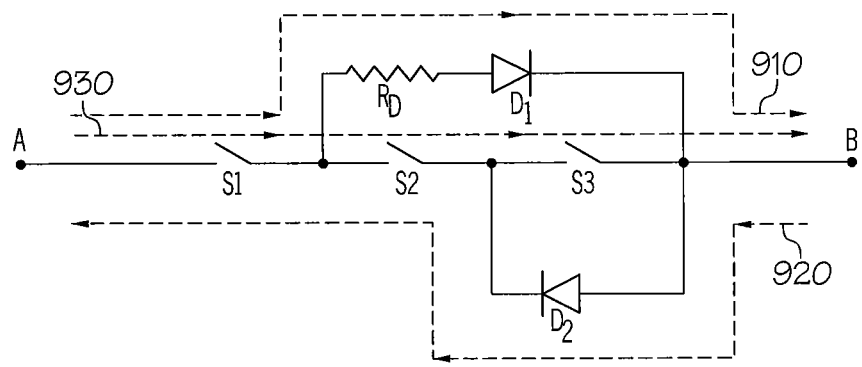

FIG. 8 illustrates an electronic circuit 800 that may correspond to the switching topology 110 of FIG. 1, according to some embodiments of the inventive concepts. Referring now to FIG. 8, electronic circuit 800 may include switches S1, S2, and/or S3. Diode D2 may be in parallel with switch S3. Although FIG. 8 illustrates a single element Diode D2 in parallel with a single switch S3, other elements may be in series with Diode D2 and/or with switch S3, but Diode D2 will still be considered as being in parallel with S3, even in the presence of other elements in series or in parallel with Diode D2 and/or with switch S3. Diode D1 may be in series with resistive element RD. Operations related to turning on the electronic circuit 800 to power the capacitor bank C of FIG. 1 are illustrated in the AC current graph of FIG. 9A. Related current flows in the electronic circuit 800 of FIG. 8 are shown in FIG. 9B. Referring to FIG. 9A, switch S1 may be activated, i.e. turned on or closed, at time t2. Switch S1 is configured to be activated when the AC power signal from the grid power source has negative polarity. When the AC power signal transitions to positive polarity at time t3, diode D1 will be conducting such that current flows through the circuit in path 910, as shown in FIG. 9B. In other words, diode D1 is configured to be turned on responsive to the AC power signal transitioning to positive polarity such that the AC power signal flows through resistive element RD, diode D1, and the switch S1. FIG. 9A illustrates that switch S2 is turned on at time t4. The switch S2 is configured to be turned on after the diode D1 has been turned on, i.e. conducting. Diode D1 turns off, i.e. does not conduct, at time t5, responsive to the AC power signal transitioning to negative polarity such that the AC power signal flows through switch S1, switch S2, and diode D2, as shown in FIG. 9B along path 920. FIG. 9A illustrates that switch S3 is activated, i.e. turned on, at time t6. The AC power signal flows through the switch S1, switch S2, and switch S3 to the capacitor bank along path 930 of FIG. 9B.

Figure 10A:
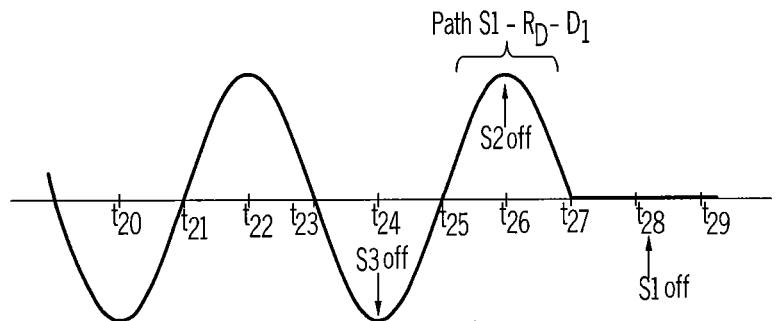
Figure 10B:
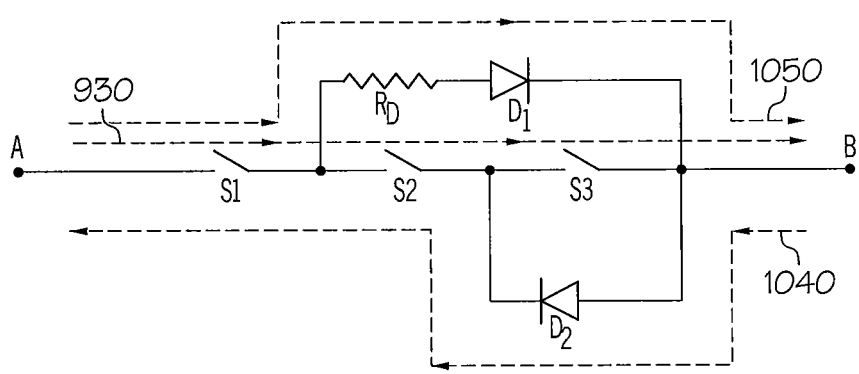

Operations related to turning off the electronic circuit 800 of FIG. 8 to remove power from the capacitor bank C of FIG. 1 are illustrated in the AC current graph of FIG. 10A. Related current flows in the electronic circuit 800 of FIG. 8 are shown in FIG. 10B. Referring to FIG. 10A, the capacitor bank is being powered by the grid power source such that current flows in path 930 of FIG. 10B through switches S1, S2, and S3. At time t24, switch S3 may be turned off, i.e. deactivated, such that diode D2 will begin conducting current so that current flows in path 1040 of FIG. 10B, through diode D2, switch S2, and switch S1. S2 may be deactivated, i.e. turned off, during the AC power signal's positive polarity cycle, for example, at time t26 as shown in FIG. 10A. Current will then flow in path 910 though switch S1, resistive element RD, and diode D1. S1 may be deactivated, i.e. turned off, during the AC power signal's negative polarity cycle, for example, at time t28 as shown in FIG. 10A.

Figure 11:
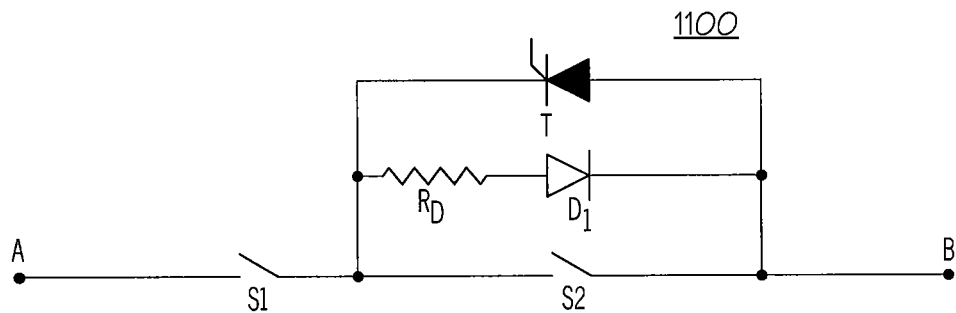
Figure 12A:
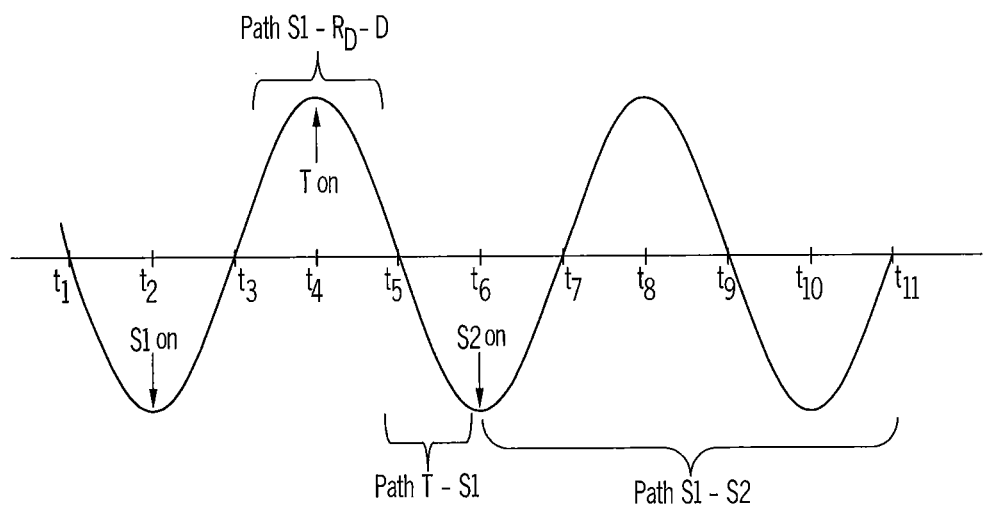
Figure 12B:
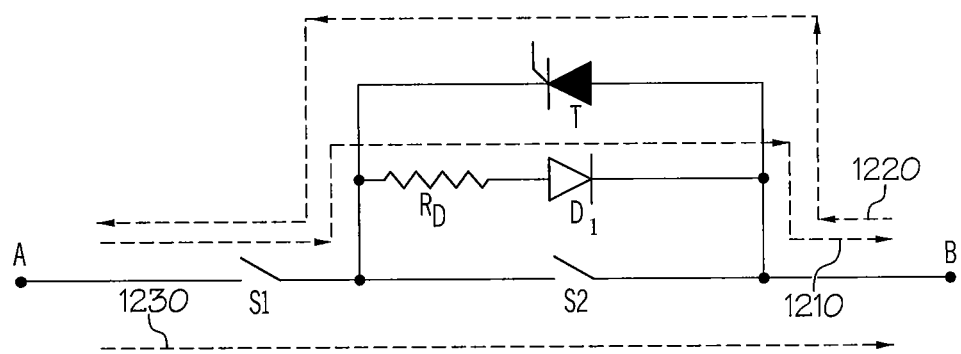

FIG. 11 illustrates an electronic circuit 1100 that may correspond to the switching topology 110 of FIG. 1. Referring now to FIG. 11, electronic circuit 1100 may include switches S1 and S2. Diode D1 and resistive element RD are in series with one another and may be collectively in parallel with switch S2 and may be in parallel with thyristor T. As used herein, elements may be considered to be in parallel with one another even if other elements are present in series and/or in parallel with the elements. Operations related to turning on the electronic circuit 1100 to power the capacitor bank C of FIG. 1 are illustrated in the AC current graph of FIG. 12A. Related current flows in the electronic circuit 1100 of FIG. 11 are shown in FIG. 12B. Referring to FIG. 12A, switch S1 may be activated, i.e. turned on or closed, at time t2. Switch S1 is configured to be activated when the AC power signal from the grid power source has negative polarity. When the AC power signal transitions to positive polarity at time t3, diode D will be conducting such that current flows through the circuit along path 1210, as shown in FIG. 12B. In other words, diode D is configured to be turned on responsive to the AC power signal transitioning to positive polarity such that the AC power signal flows through the diode D, resistive element RD and switch S1. In some embodiments, the thyristor T may be turned on as soon as the diode starts conducting but before the polarity of AC power signal reverses to negative. For example, FIG. 12A illustrates that thyristor T is turned on at time t4. The thyristor T is configured to be turned on based on an activation pulse from the controller 120 of FIG. 1. The thyristor T is configured to be turned on after the diode D has been turned on, i.e. conducting. Diode D turns off, i.e. does not conduct, at time t5, responsive to the AC power signal transitioning to negative polarity such that the AC power signal flows through switch S1 and the thyristor T, as shown in FIG. 12B along path 1220. FIG. 12A illustrates that switch S2 is activated, i.e. turned on, at time t6. Switch S2 is activated after the diode D has been turned on responsive to the AC power signal transitioning to positive polarity and turned off responsive to the AC power signal transitioning to negative polarity. The AC power signal flows through switch S1 and switch S2 to the capacitor bank along path 1230 of FIG. 12B.

Figure 13A:
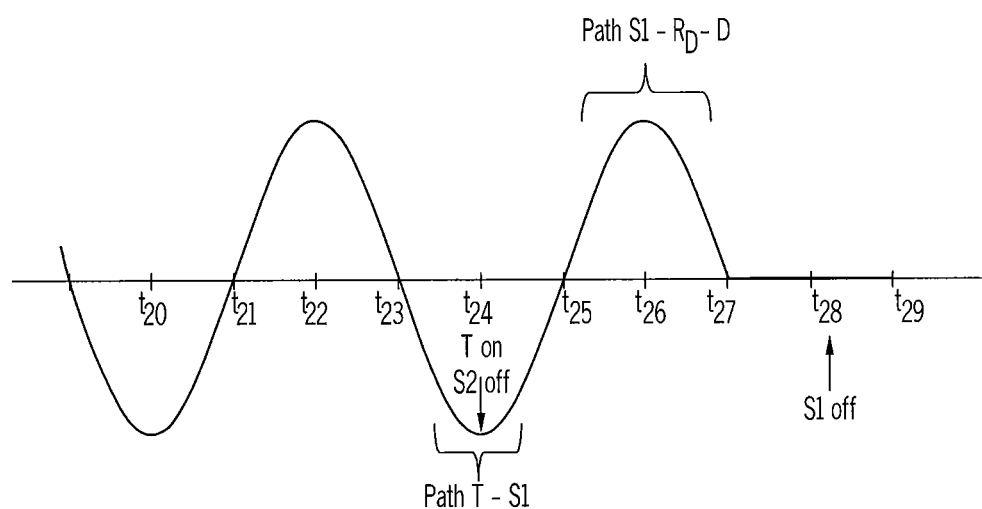
Figure 13B:
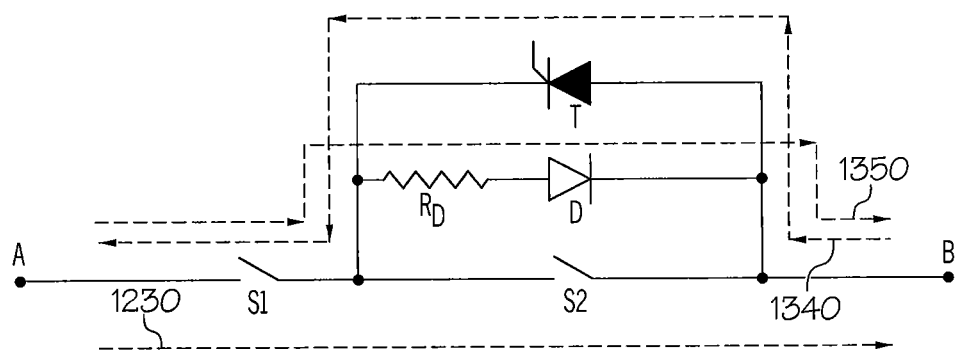

Operations related to turning off the electronic circuit 1100 of FIG. 11 to remove power from the capacitor bank C of FIG. 1 are illustrated in the AC current graph of FIG. 13A. Related current flows in the electronic circuit 1100 of FIG. 11 are shown in FIG. 13B. Referring to FIG. 13A, the capacitor bank is being powered by the grid power source such that current flows along path 1230 of FIG. 13B through switches S1 and S2. At time t24, a pulse may be sent by the controller to turn on thyristor T. At time t24, switch S2 may be turned off, i.e. deactivated, and the load current starts flowing through the path 1340 through the thyristor T and switch S1. When the AC power signal transitions to positive polarity at time t25, diode D1 will begin conducting current so that current flows along path 1350 of FIG. 13B, through diode D1, resistive element RD, and switch S1. Diode D1 turns off, i.e. does not conduct, at time t27, responsive to the AC power signal transitioning to negative polarity such that the AC power signal does not conduct after time t27. S1 may be deactivated, i.e. turned off, during the AC power signal's negative polarity cycle, for example, at time t28 as shown in FIG. 13A.

Figure 14:
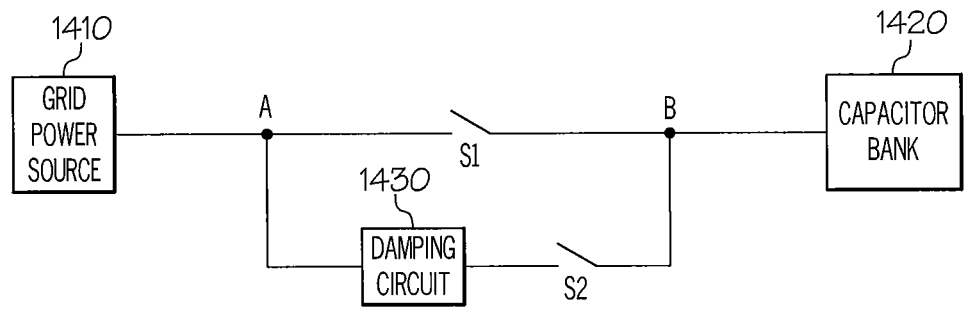
FIGS. 14, 15, and 16 are block diagrams of the electronic circuits of FIGS. 2, 8, and/or 11, according to various embodiments described herein.
Figure 15:
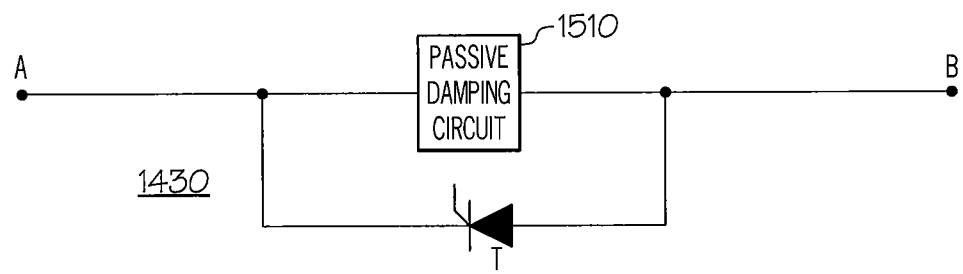

FIGS. 14 and 15 are block diagrams of a circuit to switch an alternating current (AC) power signal from a grid power source to a capacitor bank. The circuit of FIGS. 14 and 15 may correspond to the circuits of FIGS. 2, 8, and/or 11. Referring to FIG. 14, grid power source 1410 may be coupled to a switch S1 and a damping circuit 1430. Damping circuit 1430 may be in series with switch S2. Switch S2 and switch S1 may be coupled to capacitor bank 1420. FIG. 15 is a block diagram of the damping circuit 1430 of FIG. 14. The damping circuit 1430 includes a passive damping circuit 1510 in parallel with thyristor 15.

Figure 16:
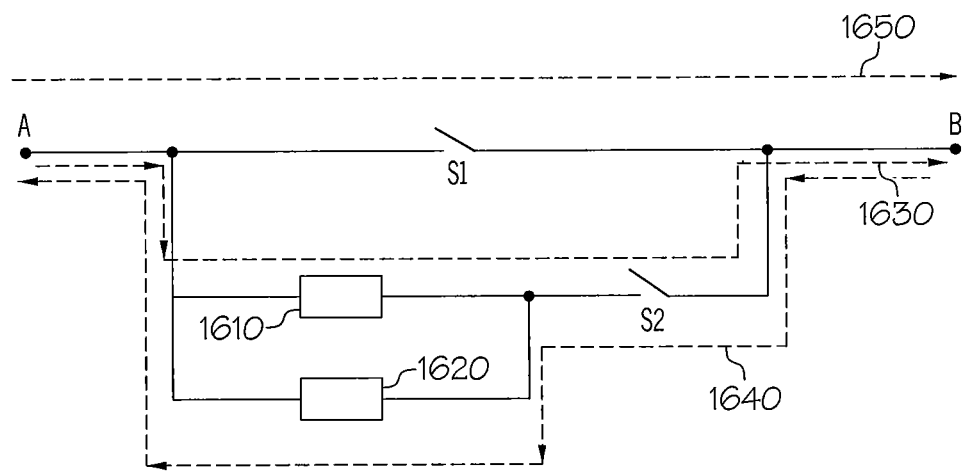

FIG. 16 illustrates the switching topology of FIG. 1, according to some embodiments described herein. The switching topology may include a circuit to be coupled to a capacitor bank in a power system network and configured to be coupled to an AC power signal from a grid power source. A controller may be configured to control the circuit of FIG. 16. The controller may be configured to control a first current path 1630 and a second current path 1640 that are between the grid power source and the capacitor bank. The circuit may be configured to conduct current in a first direction along the first current path 1630 through switch S2, responsive to the second switch S2 in the first current path 1630 being activated. The circuit may be configured to conduct the current in a second direction along the second current path 1640, responsive to the AC power signal transitioning to a negative polarity.

Still referring to FIG. 16, the controller may be configured to control a third current path 1650 between the grid power source and the capacitor bank. The circuit may be configured to conduct the current along the third current path 1650, responsive to a first switch S1 in the third current path 1650 being activated. The third current path 1650 is different from the first current path 1630 and the second current path 1640.

In some embodiments, the circuit of FIG. 16 may include a damping circuit 1610 in series with the second switch S2. The passive damping circuit 1610 may include a diode, such as diode D that is in the first current path. The damping circuit is in parallel with a thyristor, 1620, such as the thyristor T of FIG. 2, in the second current path. The second switch S2 may be configured to be activated by the controller when the AC power signal from the grid power source has negative polarity. The diode may be configured to be turned on responsive to the AC power signal transitioning to positive polarity. The AC power signal flows through the first current path 1630 that includes the diode, damping resistor, and the switch S2 when the switch S2 has been activated. The thyristor T may be configured to be turned on when the AC power signal from the grid power source has positive polarity. The diode is configured to be turned off, responsive to the AC power signal transitioning to negative polarity such that the AC power signal flows through the second current path 1640. The first switch S1 is configured to be activated when the AC power signal from the grid power, source has negative polarity such that the AC power signal flows through the first switch S1 to the capacitor bank. The switch S2 may be deactivated by the controller after the current starts flowing through the first switch. In other words, switch S2 may be deactivated when S1 takes over the load current. The passive damping circuit 1610 may include a resistive element connected in series with the diode and connected to an anode of the diode.

FIG. 17 is a table of operations according to various embodiments described herein. The operations of FIG. 17 may be applied to the electronic circuit 200 of FIG. 2. Operations for activating the circuit 200 of FIG. 2 will be described. Activating the electronic circuit 200 of FIG. 2 has an initial state of switches S1 and S2 being open, i.e. state=0. The AC signal flowing in the circuit may have polarity A which is opposite polarity B. For example, polarity A may be positive polarity and polarity B may be negative polarity. As shown in the graphs of FIGS. 3A, 4A, and 5A, switch S2 may be closed, i.e. state=1, while the AC signal is at polarity B. The thyristor may be activated, i.e. conducting while the AC signal is at polarity A. As a non-limiting example, the thyristor may be turned on as soon as the diode starts conducting but before the polarity of AC power signal reverses to negative. Switch S1 may be closed while the AC signal is at polarity B. Switch S2 and the thyristor T may be deactivated at a time thereafter.

Still referring to FIG. 17, operations for deactivating the circuit 200 of FIG. 2 will be described. As an initial condition, the circuit is operational to supply power to the capacitor bank such that switch S1 is closed, switch S2 is open, and thyristor T is deactivated. S2 may be closed at any time to start the deactivation operation. The thyristor may be conducting, i.e. activated, while the AC signal is at polarity A. Switch S1 is opened while the AC signal is at polarity B. The thyristor is non-conducting, i.e. deactivated, while the AC signal is at polarity A. Switch S2 is opened while the AC signal is at polarity B. The power is thus removed from the capacitor bank and all switches are in an open state.

Figure 18:
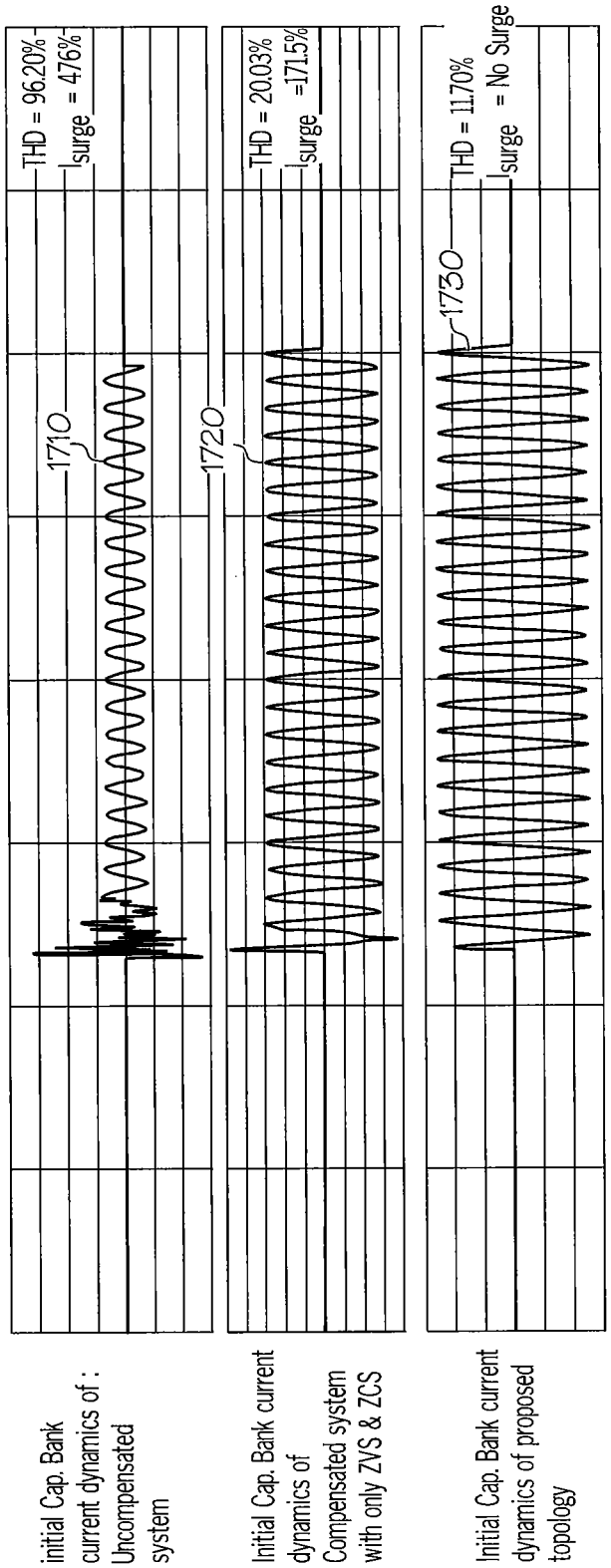
FIG. 18 is a graph of capacitor bank current under various conditions, according to various embodiments described herein.

FIG. 18 is a graph of the capacitor bank current under various conditions. Referring now to FIG. 18, graph 1710 illustrates the current dynamics of an uncompensated system, graph 1720 illustrates the current dynamics of a system with mechanical switches and compensation with zero voltage switching (ZVS) and zero current switching (ZCS), and graph 1730 illustrates the current dynamics according to various embodiments described herein. Graph 1710 includes a large in-rush current that may reduce the life of the switching product. As illustrated in graph 1730, the inventive concepts described herein produce a solution with zero turn voltage and zero turn off voltage with minimal on-state drop in the circuit of FIG. 2 since a single contact is in line with the continuous current. Solid state devices may be used to implement the switches described herein since solid state switches are rated for lower power. FIG. 18 includes the total harmonic distortion (THD) for each case. THD is a measure of the disturbance from switching across various frequencies. The surge current, Isurge is an amplitude ratio of a maximum surge current over a steady state current. As shown in graph 1730, the switching circuits described herein significantly improve the THD and reduce and/or eliminate the surge current.

Figure 19:
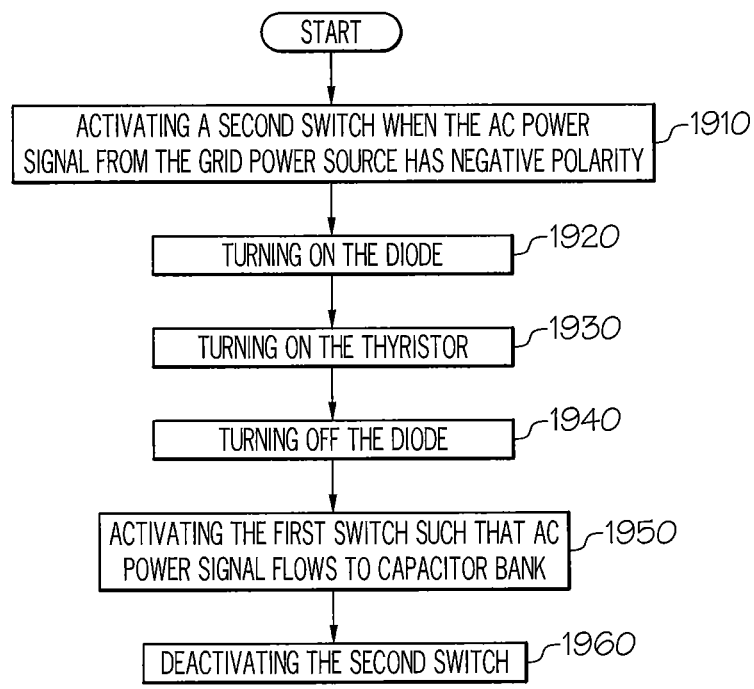
FIG. 19 is a flowchart of operations for of an electronic device in a power system network, according to various embodiments described herein.

FIG. 19 is a flowchart of operations for of an electronic device in a power system network, according to various embodiments described herein. Referring now to FIG. 19, the electronic device is configured to be coupled to a capacitor bank in a power system network and configured to be coupled to an alternating current (AC) power signal from a grid power source. The method includes activating a second switch when the AC power signal from the grid power source has negative polarity, at block 1910. The second switch may be in series with a damping circuit including a thyristor in parallel with a passive damping circuit that includes a diode. The method includes turning on the diode, responsive to the AC power signal transitioning to positive polarity, at block 1920. The AC power signal flows through the diode and the second switch that has been activated. The method includes turning on the thyristor, at block 1930. The method include turning off the diode, responsive to the AC power signal transitioning to negative polarity such that the AC power signal flows through the second switch and the thyristor, at block 1940. The method includes activating a first switch such that the AC power signal flows through the first switch to the capacitor bank, at block 1950, and deactivating the second switch, at block 1960.

Various embodiments presented herein may be beneficial for increasing the life of power system capacitor banks used in voltage distribution networks. The techniques for switching topologies described herein reduce or remove the heavy inrush current and/or harmonics of the current from the AC power supply to improve performance of the power system network.

Further Definitions

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles of the present invention. All such variations and modifications are intended to be included herein within the scope of the present invention.

The invention claimed is:

1. An electronic device that is configured to be coupled to a capacitor bank in a power system network and configured to be coupled to an alternating current (AC) power signal from a grid power source, the electronic device comprising:
   a first switch;
   a second switch; and
   a damping circuit in series with the second switch,
   wherein the damping circuit comprises a passive damping circuit and a thyristor that is in parallel with the passive damping circuit,
   wherein the passive damping circuit comprises a diode that is in series with a resistive element,
   wherein an anode of the diode is connected to the resistive element and a cathode of the diode is connected to the second switch,
   wherein the electronic device is configured to conduct current in a first direction along a first current path including the passive damping circuit, responsive to the second switch that is in the first current path being activated, and
   wherein the electronic device is configured to conduct the current in a second direction along a second current path including the thyristor, responsive to the AC power signal transitioning to a negative polarity.

2. The electronic device of claim 1,
   wherein the first switch and second switch are coupled to each other and are configured to be coupled to the capacitor bank, and
   wherein the first switch is coupled to the grid power source.

3. The electronic device of claim 2, wherein the damping circuit is coupled to the grid power source.

4. The electronic device of claim 1, wherein the passive damping circuit is configured to dampen current harmonics and voltage harmonics during switching of the capacitor bank to the grid power source.

5. The electronic device of claim 4, wherein the passive damping circuit is configured to remove current harmonics and voltage harmonics during switching of the capacitor bank to the grid power source.

6. The electronic device of claim 1, wherein the electronic device is configured to reduce or eliminate transient current when the grid power source is coupled through the electronic device to the capacitor bank.

7. The electronic device of claim 1, wherein the diode is configured to be turned on responsive to the AC power signal transitioning to positive polarity such that the AC power signal flows through the diode and the second switch.

8. The electronic device of claim 7,
   wherein the thyristor is configured to be turned on based on an activation pulse from a control circuit, and
   wherein the thyristor is configured to be turned on after the diode has been turned on.

9. The electronic device of claim 8, wherein the diode is configured to be turned off responsive to the AC power signal transitioning to negative polarity such that the AC power signal flows through the second switch and the thyristor.

10. The electronic device of claim 9, wherein after the diode has been turned on responsive to the AC power signal transitioning to positive polarity and turned off responsive to the AC power signal transitioning to negative polarity, the first switch is configured to be activated such that the AC power signal flows through the first switch to the capacitor bank.

11. The electronic device of claim 10, wherein the second switch is configured to be deactivated after the first switch has been activated such that the AC power signal flows through the first switch to the capacitor bank.

12. A circuit configured to be coupled to a capacitor bank in a power system network and configured to be coupled to an alternating current (AC) power signal from a grid power source, the circuit comprising:
    a controller configured to control a first current path and a second current path that are between the grid power source and the capacitor bank,
    wherein the circuit is configured to conduct current in a first direction along the first current path, responsive to a second switch in the first current path being activated, and
    wherein the circuit is configured to conduct the current in a second direction along the second current path, responsive to the AC power signal transitioning to a negative polarity.

13. The circuit of claim 12,
    wherein the controller is further configured to control a third current path between the grid power source and the capacitor bank,
    wherein the circuit is configured to conduct the current along the third current path, responsive to a first switch in the third current path being activated, and
    wherein the third current path is different from the first current path and the second current path.

14. The circuit of claim 12, wherein the circuit further comprises:
    a damping circuit in series with the second switch, wherein the damping circuit comprises a thyristor in the second current path; and
    a passive damping circuit in parallel with the thyristor, wherein the passive damping circuit comprises a diode that is in the first current path,
    wherein the second switch is configured to be activated by the controller when the AC power signal from the grid power source has negative polarity,
    wherein the diode is configured to be turned on responsive to the AC power signal transitioning to positive polarity,
    wherein the AC power signal flows through the first current path comprising the diode and the second switch when the second switch has been activated,
    wherein the thyristor is configured to be turned on when the AC power signal from the grid power source has positive polarity,
    wherein the diode is configured to be turned off, responsive to the AC power signal transitioning to negative polarity such that the AC power signal flows through the second current path, wherein is a first switch is configured to be activated by the controller when the AC power signal from the grid power source has negative polarity such that the AC power signal flows through the first switch to the capacitor bank, and wherein the second switch is configured to be deactivated by the controller after the current is flowing through the first switch.

15. The circuit of claim 14, wherein the passive damping circuit further comprises a resistive element connected in series with the diode and connected to an anode of the diode.

16. The circuit of claim 14, wherein the controller is configured to turn on the thyristor based on an activation pulse from a control circuit.

17. The circuit of claim 14, wherein the second switch is changed to a non-conductive state when no current is flowing through the second switch.

18. A method of operating an electronic device that is configured to be coupled to a capacitor bank in a power system network and configured to be coupled to an alternating current (AC) power signal from a grid power source, the method comprising:

activating a second switch when the AC power signal from the grid power source has negative polarity, wherein the second switch is in series with a damping circuit comprising a thyristor in parallel with a passive damping circuit that comprises a diode;

turning on the diode, responsive to the AC power signal transitioning to positive polarity, wherein the AC power signal flows through the diode and the second switch that has been activated;

turning on the thyristor after the diode has been turned on;

turning off the diode, responsive to the AC power signal transitioning to negative polarity such that the AC power signal flows through the second switch and the thyristor;

activating a first switch such that the AC power signal flows through the first switch to the capacitor bank; and deactivating the second switch after the AC power signal flows through the first switch to the capacitor bank.

* * * * *